(12) United States Patent
Yu et al.

(10) Patent No.: US 10,363,804 B2
(45) Date of Patent: Jul. 30, 2019

(54) VEHICLE ELECTRICALLY DRIVING ASSEMBLY

(71) Applicant: Jing-Jin Electric Technologies Co., Ltd., Beijing (CN)

(72) Inventors: Ping Yu, Beijing (CN); Changqi Yang, Beijing (CN); Ting Wang, Beijing (CN); Jianwen Li, Beijing (CN); Xixian Yang, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 15/737,099

(22) PCT Filed: Jan. 20, 2017

(86) PCT No.: PCT/CN2017/071839
§ 371 (c)(1),
(2) Date: Dec. 15, 2017

(87) PCT Pub. No.: WO2018/058867
PCT Pub. Date: Apr. 5, 2018

(65) Prior Publication Data
US 2018/0304732 A1    Oct. 25, 2018

(30) Foreign Application Priority Data
Sep. 28, 2016 (CN) .................... 2016 2 1091259 U

(51) Int. Cl.
*B60K 1/00* (2006.01)
*B60K 17/02* (2006.01)
(Continued)

(52) U.S. Cl.
CPC ............... *B60K 1/00* (2013.01); *B60K 17/02* (2013.01); *B60K 17/06* (2013.01); *B60K 17/12* (2013.01);
(Continued)

(58) Field of Classification Search
CPC .......... B60K 1/00; B60K 17/12; B60K 17/02; B60K 17/165; B60K 17/06; B60K 6/485;
(Continued)

(56) References Cited

U.S. PATENT DOCUMENTS

2002/0084118 A1* 7/2002 Esaki ................. B60K 6/40
180/65.25
2003/0089539 A1* 5/2003 Kadota ............... B60K 6/44
180/65.225
(Continued)

FOREIGN PATENT DOCUMENTS

CN         1915702 A     2/2007
CN       202703266 U     1/2013
(Continued)

OTHER PUBLICATIONS

International Search Report (PCT/ISA/210) dated Jun. 28, 2017, by the State Intellectual Property Office of the P.R. China as the International Searching Authority for International Application No. PCT/CN2017/071839.
(Continued)

*Primary Examiner* — Erez Gurari
(74) *Attorney, Agent, or Firm* — Buchanan Ingersoll & Rooney PC

(57) ABSTRACT

A vehicle electrically driving assembly, connected to the rear or front axle half shaft of the vehicle, that includes: an electric motor, a speed reducer, an electromagnetic tooth-mounted clutch and a differential. The speed reducer has multiple stages of gears, an input shaft and an intermediate shaft; the differential is connected between the axle half shafts; the electromagnetic tooth-mounted clutch is installed on the input shaft or the intermediate shaft of the speed reducer or on the axle half shafts. When the electromagnetic tooth-mounted clutch is in engagement, driving force of the electric motor is transmitted to the vehicle axle via the speed
(Continued)

reducer and the electromagnetic jaw clutch, to provide an auxiliary driving force to the vehicle. When the power of the entire vehicle is insufficient at the acceleration phase, the electrically driving assembly, by using the electromagnetic jaw clutch, provides an auxiliary driving force to the entire vehicle.

6 Claims, 2 Drawing Sheets

(51) Int. Cl.
| | |
|---|---|
| B60K 17/06 | (2006.01) |
| B60K 17/16 | (2006.01) |
| F16D 27/09 | (2006.01) |
| F16D 27/14 | (2006.01) |
| H02K 7/11 | (2006.01) |
| H02K 7/116 | (2006.01) |
| H02K 7/00 | (2006.01) |
| F16H 3/091 | (2006.01) |
| B60K 17/12 | (2006.01) |
| B60K 6/485 | (2007.10) |

(52) U.S. Cl.
CPC ............ *B60K 17/165* (2013.01); *F16D 27/09* (2013.01); *F16D 27/14* (2013.01); *F16H 3/091* (2013.01); *H02K 7/006* (2013.01); *H02K 7/11* (2013.01); *H02K 7/116* (2013.01); *B60K 6/485* (2013.01); *B60K 2001/001* (2013.01); *B60Y 2200/91* (2013.01); *B60Y 2200/92* (2013.01)

(58) Field of Classification Search
CPC .......... F16H 3/091; H02K 7/006; H02K 7/11; H02K 7/116; F16D 27/14; F16D 27/09; B60Y 2200/91–2
See application file for complete search history.

(56) References Cited

U.S. PATENT DOCUMENTS

| | | | | |
|---|---|---|---|---|
| 2009/0247341 | A1* | 10/2009 | Abe .................. | B60K 6/26 475/5 |
| 2011/0034282 | A1* | 2/2011 | Akutsu ............... | B60K 6/26 475/5 |
| 2013/0341150 | A1* | 12/2013 | Ikegawa ............. | F16D 27/105 192/80 |
| 2014/0004987 | A1* | 1/2014 | Sato .................. | F16H 3/089 475/150 |
| 2014/0235394 | A1* | 8/2014 | Smetana ............. | B60K 6/365 475/151 |
| 2014/0235402 | A1* | 8/2014 | Matsubara .......... | B60K 1/00 477/8 |
| 2014/0374211 | A1* | 12/2014 | Date .................. | B60K 6/387 192/85.01 |
| 2016/0207389 | A1* | 7/2016 | Yang ................. | B60K 6/38 |
| 2016/0207391 | A1* | 7/2016 | Yang ................. | B60K 6/36 |
| 2016/0207392 | A1* | 7/2016 | Zhang ................ | F16H 3/006 |
| 2017/0305258 | A1* | 10/2017 | Liu ................... | B60K 6/36 |
| 2017/0305260 | A1* | 10/2017 | Ruan ................. | B60K 6/36 |
| 2018/0209526 | A1* | 7/2018 | Lian .................. | F16H 48/06 |
| 2018/0264928 | A1* | 9/2018 | Takaki ............... | B60K 6/485 |
| 2018/0304732 | A1* | 10/2018 | Yu .................... | B60K 17/12 |

FOREIGN PATENT DOCUMENTS

| | | |
|---|---|---|
| CN | 104191953 A | 12/2014 |
| CN | 105346373 A | 2/2016 |
| DE | 19803160 C1 | 5/1999 |

OTHER PUBLICATIONS

Written Opinion (PCT/ISA/237) dated Jun. 28, 2017, by the State Intellectual Property Office of the P.R. China as the International Searching Authority for International Application No. PCT/CN2017/071839.

* cited by examiner

VEHICLE ELECTRICALLY DRIVING ASSEMBLY

TECHNICAL FIELD

The present invention relates to the technical field of a vehicle transmission, and particularly relates to a vehicle electrically driving assembly.

BACKGROUND

In current purely electrically driven automobiles and hybrid automobiles, the dynamic characteristics of electric motors cannot meet the requirements of entire vehicles, therefore the startup acceleration performances of the entire vehicle of purely front-driven or rear-driven new energy automobiles are relatively insufficient.

Furthermore, presently, the speed reducers of purely electrically driven or hybrid new energy automobiles cannot use conventional friction clutches because of the large shock on the rotor shaft of electric motor. Therefore, conventional speed reducers carried by electric motors can only adopt hard connection mode, and such clutches have neither of clutching function, cushioning function and self-aligning function, and the requirements of new energy automobiles cannot be satisfied. In addition, as the power system of the entire vehicle does not have clutching function, the startup and stop of the entire vehicle can only rely on the startup and stop of the electric motor, which affects the startup and stop response time of the entire vehicle.

SUMMARY

In view of the above problems, the present invention provides a vehicle electrically driving assembly, to solve the problems that the startup acceleration performances of the entire vehicle of the existing simple front-driven or rear-driven new energy automobiles is relatively insufficient and that the startup and stop response time of the entire vehicle is delayed.

To achieve the above objects, the technical solutions of the present invention are realized as follows:

The present invention provides a vehicle electrically driving assembly, connected to a vehicle axle half shafts of a vehicle, wherein the electrically driving assembly comprises: an electric motor, a speed reducer, an electromagnetic tooth-mounted clutch and a differential; the speed reducer is provided with multiple stages of gears, an input shaft and an intermediate shaft;

the differential is connected between the vehicle axle half shafts;

the electromagnetic tooth-mounted clutch is installed on the input shaft or the intermediate shaft of the speed reducer or on the vehicle axle half shafts; and when the electromagnetic tooth-mounted clutch is in engagement, a driving force of the electric motor is transmitted to the vehicle axle half shafts via the speed reducer and the electromagnetic jaw clutch, to provide the driving force to the vehicle.

Optionally, the speed reducer comprises: a first stage driving gear, a first stage driven gear, a second stage driving gear and a second stage driven gear, and the gears of the same stage are in engagement; and the electromagnetic tooth-mounted clutch comprises: a fixed face tooth, a movable face tooth, a solenoid assembly and a return elastic assembly, and when the solenoid assembly is powered off, the return elastic assembly drives the movable face tooth to reset, the return elastic assembly is a spring, an elastic sheet, a diaphragm spring or a spring assembly, and the spring assembly comprises several springs.

Optionally, the fixed face tooth is installed on the first stage driving gear, the first stage driving gear is loosely nested on the input shaft, and the movable face tooth is installed on the input shaft via a transmission pair and is slidable on the transmission pair; and both the first stage driven gear and the second stage driving gear are fixedly connected to the intermediate shaft, and the second stage driven gear is fixedly connected to the differential.

Optionally, the fixed face tooth is installed on the first stage driven gear, the first stage driven gear is loosely nested on the intermediate shaft, and the movable face tooth is installed on the intermediate shaft via a transmission pair and is slidable on the transmission pair; and the first stage driving gear is fixedly connected to the input shaft, the second stage driving gear is fixedly connected to the intermediate shaft, and the second stage driven gear is fixedly connected to the differential.

Optionally, the fixed face tooth is installed on the second stage driving gear, the second stage driving gear is loosely nested on the intermediate shaft, and the movable face tooth is installed on the intermediate shaft via a transmission pair and is slidable on the transmission pair;

the first stage driving gear is fixedly connected to the input shaft, the first stage driven gear is fixedly connected to the intermediate shaft, and the second stage driven gear is fixedly connected to the differential; and the electric motor drives the input shaft to rotate, and in turn drives the first stage driving gear, the first stage driven gear and the movable face tooth to rotate.

Optionally, the fixed face tooth is installed on the second stage driven gear, the second stage driven gear is loosely nested on the vehicle axle half shafts, and the movable face tooth is installed on the vehicle axle half shafts via a transmission pair and is slidable on the transmission pair;

the first stage driving gear is fixedly connected to the input shaft, and both the first stage driven gear and the second stage driving gear are fixedly connected to the intermediate shaft; and the electric motor drives the input shaft to rotate, and in turn drives the first stage driving gear, the first stage driven gear, the second stage driving gear and the second stage driven gear to rotate, and the rotating of the second stage driven gear drives the fixed face tooth to rotate.

Optionally, the solenoid assembly comprises: a coil housing, wires and a sealant.

Optionally, and the electromagnetic tooth-mounted clutch is a normally open clutch or a normally closed clutch.

Optionally, a rear end cover of the electric motor and a front housing of the speed reducer are the same housing, and a rotor shaft of the electric motor and the input shaft of the speed reducer are the same shaft.

Optionally, the return elastic assembly is a spring, an elastic sheet, a diaphragm spring or a spring assembly, and the spring assembly comprises several springs.

Optionally, the vehicle electrically driving assembly is master drive or assist drive, and the vehicle axle half shafts including front axle half shafts or rear axle half shafts.

Optionally, the transmission pair is a spline, a single key, a square shaft or a flat shaft.

The electrically driving assembly of the present invention is installed on simple front-driven or rear-driven purely electrically driven or hybrid vehicles. When the power of the entire vehicle is insufficient at the startup acceleration phase or the acceleration phase during running, the electrically driving assembly, by using the electromagnetic jaw clutch, provides an auxiliary driving force to the entire vehicle, which is equivalent to realizing the four-wheel driving function, and overcomes the defect of the insufficient acceleration performance of new energy vehicles. When the entire vehicle completes the acceleration and maintains a low acceleration or does not accelerate, the power of the electrically driving assembly can be instantly released from the entire vehicle by separating the electromagnetic jaw clutch, to restore the front driving mode and save energy.

The design mode of the electromagnetic tooth-mounted clutch can minimize the kinetic energy loss, and overcome the defect of traditional friction clutches that their service lives are too short because they cannot withstand the dynamic shock of the electric motor.

Furthermore, when the vehicle electrically driving assembly of the present invention serves as the master drive of purely electrically driven or hybrid vehicles, the electromagnetic tooth-mounted clutch enables the power of the electric motor to be released and engaged with the entire vehicle instantly at any moment, and thus the problem that the startup and stop of the existing purely electrically driven or hybrid vehicles can only rely on the startup and stop of the electric motor, and the problem that the startup and stop response time is delayed are solved.

The above description is merely an overview of technical solutions of the present invention. In order to more apparently understand the technical solutions of the present invention and implement them in accordance with the contents of specification, and to more readily understand above and other objectives, features and advantages of the present invention, particular embodiments of the present invention are provided hereinafter.

BRIEF DESCRIPTION OF THE DRAWINGS

Various other advantages and merits will become apparent to those having ordinary skill in the art by reading through the detailed description of the following preferred embodiments. Accompanying drawings are merely included for the purpose of illustrating the preferred embodiments and should not be considered as limiting of the present invention. Further, throughout the drawings, like reference signs are used to denote like elements. In the drawings.

DESCRIPTION OF THE EMBODIMENTS

Exemplary embodiments of the present invention will be described in more detail below with reference to the accompanying drawings. Although the accompanying drawings display the exemplary embodiments of the present invention, it should be understood that the present invention may be implemented in various forms and not limited by the embodiments set forth herein. Instead, these embodiments are provided to facilitate those skilled in the art more thoroughly understand the present invention, and completely convey the scope of the present invention to them.

First Embodiment

Figure 1:
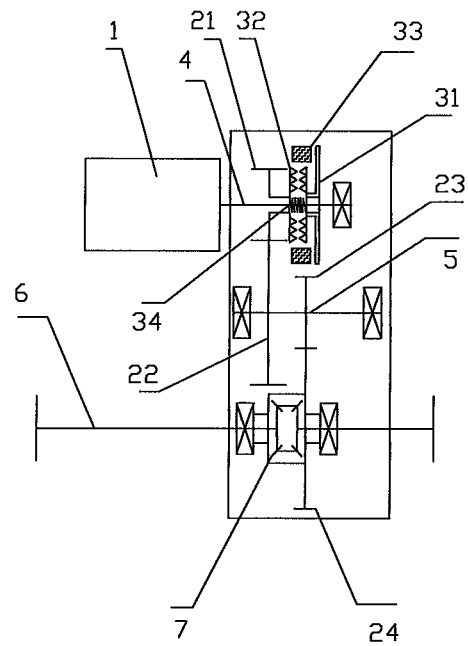
FIG. 1 is a schematic diagram of the structure of a vehicle electrically driving assembly of the first embodiment of the present invention.

As shown in FIG. 1, the embodiment of the present disclosure provides a vehicle electrically driving assembly, connected to a rear axle half shaft 6 of the vehicle, the vehicle electrically driving assembly comprises: an electric motor 1, a speed reducer, an electromagnetic tooth-mounted clutch and a differential 7;

the speed reducer is provided with multiple stages of gears, an input shaft 4 and an intermediate shaft 5;

the differential 7 is connected between the rear axle half shaft 6;

the electromagnetic tooth-mounted clutch is installed on the input shaft 4 of the speed reducer; and when the electromagnetic tooth-mounted clutch is in engagement, the driving force of the electric motor 1 is transmitted to the rear axle half shaft 6 via the speed reducer and the electromagnetic jaw clutch, to provide an auxiliary driving force to the vehicle.

The electrically driving assembly is installed on the rear axle half shaft 6 of purely electrically driven or hybrid vehicles that are simple front-driven. When the power of the entire vehicle is insufficient at the startup acceleration phase or the acceleration phase during running, the electrically driving assembly can, by using the electromagnetic jaw clutch, provide an auxiliary driving force to the entire vehicle, which is equivalent to realizing the four-wheel function, and overcomes the defect of the insufficient acceleration performance of new energy vehicles. When the entire vehicle completes the acceleration and maintains a low acceleration or does not accelerate, the power of the electrically driving assembly can be instantly released from the entire vehicle by separating the electromagnetic jaw clutch, to restore the front driving mode and save energy.

In an embodiment of the present invention, the speed reducer is a two-stage speed reducer and comprises: a first stage driving gear 21, a first stage driven gear 22, a second stage driving gear 23 and a second stage driven gear 24. The gears of the same stage are in engagement; that is, the first stage driving gear 21 and the first stage driven gear 22 are in engagement, and the second stage driving gear 23 and the second stage driven gear 24 are in engagement.

The electromagnetic tooth-mounted clutch comprises: a fixed face tooth 32, a movable face tooth 31, a solenoid assembly 33 and a return elastic assembly 34. When the solenoid assembly 33 is powered off, the return elastic assembly 34 drives the movable face tooth 31 to reset. The return elastic assembly 34 is a spring, an elastic sheet, a diaphragm spring or a spring assembly; the spring assembly comprises several springs. The design mode of the electromagnetic tooth-mounted clutch can minimize the kinetic energy loss, and overcome the defect of traditional friction clutches that their service lives are too short because they cannot withstand the dynamic shock of the electric motor.

The fixed face tooth 32 is installed on the first stage driving gear 21, the first stage driving gear 21 is loosely nested on the input shaft 4, and the movable face tooth 31 is installed on the input shaft 4 via a transmission pair and is slidable on the transmission pair. The transmission pair may be, but is not limited to, a spline, a single key, a square shaft or a flat shaft. When the transmission pair is a square shaft or a flat shaft, the part of the input shaft 4 on which the movable face tooth 31 is installed is configured to be square or is processed to have two cut planes, so that this part of the shaft can transmit torque when the movable face tooth 31 rotates. Both the first stage driven gear 22 and the second stage driving gear 23 are fixedly connected to the intermediate shaft 5, and the second stage driven gear 24 is fixedly connected to the differential 7.

The power transmission mode of the electrically driving assembly of the embodiment of the present invention is particularly as follows:

The electric motor 1 drives the input shaft 4 to rotate, and in turn drives the movable face tooth 31 to rotate. When the solenoid assembly 33 is powered on, the movable face tooth 31 is driven by an armature disc to slide along the input shaft 4 to a designated position and engage with the fixed face tooth 32; in turn the movable face tooth 31 drives the fixed face tooth 32 to rotate; the rotating of the fixed face tooth 32 further drives the first stage driving gear 21, to which it is fixedly connected, to rotate. Because the first stage driving gear 21 engages with the first stage driven gear 22, the first stage driving gear 21 in turn drives the first stage driven gear 22 to rotate. Because the first stage driven gear 22 is fixedly connected to the intermediate shaft 5, the first stage driven gear 22 in turn drives the intermediate shaft 5 to rotate, and in turn drives the second stage driving gear 23 on the intermediate shaft 5 to rotate. Because the second stage driving gear 23 engages with the second stage driven gear 24, the second stage driving gear 23 in turn drives the second stage driven gear 24 to rotate, and finally drives the rear axle to rotate. Accordingly, the power of the electric motor 1 is transmitted to the rear axle via the speed reducer and the electromagnetic jaw clutch, to provide an auxiliary driving force to the vehicle.

In the embodiment of the present invention, the solenoid assembly 33 comprises: a coil housing, wires and a sealant. The electromagnetic tooth-mounted clutch is a normally open clutch or a normally closed clutch.

In the embodiment of the present invention, the rear end cover of the electric motor 1 and the front housing of the speed reducer are the same housing, and the rotor shaft of the electric motor 1 and the input shaft 4 of the speed reducer are the same shaft. As the electric motor and the speed reducer employ an integration design, namely, the rear end cover of the electric motor and the front housing of the speed reducer are designed as an integral part, and the rotor shaft of the electric motor and the input shaft of the speed reducer are also designed as an integral part, the space occupied by the vehicle electrically driving assembly can be reduced, and the high requirement of concentricity between the rotor shaft and the input shaft of the speed reducer as well as the high requirement of the impact resistance of separated type electric motors are satisfied. Needless to say, the rear end cover of the electric motor 1 and the front housing of the speed reducer may also be two independent housings, as shown in FIG. 1.

Second Embodiment

Figure 2:
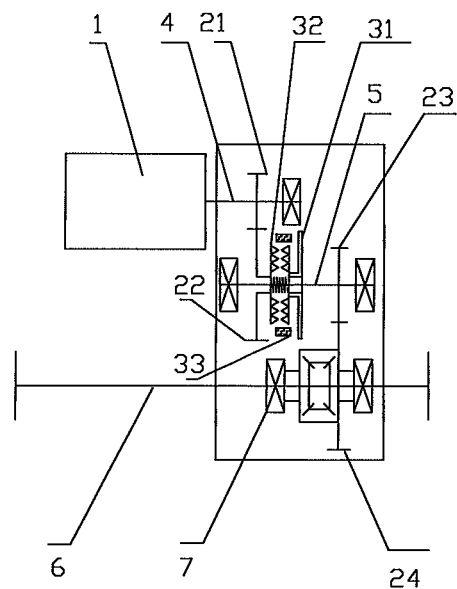
FIG. 2 is a schematic diagram of the structure of a vehicle electrically driving assembly of the second embodiment of the present invention.

As shown in FIG. 2, the second embodiment of the present invention differs from the first embodiment in that the installation location of the electromagnetic tooth-mounted clutch is different. In the second embodiment of the present invention, the electromagnetic tooth-mounted clutch is installed on the intermediate shaft 5 of the speed reducer.

The fixed face tooth 32 is installed on the first stage driven gear 22, the first stage driven gear 22 is loosely nested on the intermediate shaft 5, and the movable face tooth 31 is installed on the intermediate shaft 5 via a transmission pair and is slidable on the transmission pair. The first stage driving gear 21 is fixedly connected to the input shaft 4, the second stage driving gear 23 is fixedly connected to the intermediate shaft 5, and the second stage driven gear 24 is fixedly connected to the differential 7.

The power transmission mode of the electrically driving assembly of the embodiment of the present invention is particularly as follows:

The electric motor 1 drives the input shaft 4 to rotate, and in turn drives the first stage driving gear 21 to rotate. Because the first stage driving gear 21 engages with the first stage driven gear 22, the first stage driving gear 21 in turn drives the first stage driven gear 22 and the fixed face tooth 32 installed on the first stage driven gear 22 to rotate.

When the solenoid assembly 33 is powered on, the movable face tooth 31 is driven by an armature disc to slide along the intermediate shaft 5 to a designated position and engage with the fixed face tooth 32; in turn the fixed face tooth 32 drives the movable face tooth 31 to rotate; the rotating of the movable face tooth 31 further drives the intermediate shaft 5 to rotate; the rotating of the intermediate shaft 5 drives the second stage driving gear 23, which is fixedly connected to the intermediate shaft 5, to rotate. Because the second stage driving gear 23 engages with the second stage driven gear 24, the second stage driving gear 23 in turn drives the second stage driven gear 24 to rotate, and finally drives the differential and the vehicle axle to rotate. Accordingly, the power of the electric motor 1 is transmitted to the vehicle axle via the speed reducer and the electromagnetic jaw clutch, to provide the driving force to the vehicle.

Other contents of the second embodiment of the present invention are the same as those of the first embodiment, and will not be described repeatedly here.

Third Embodiment

Figure 3:
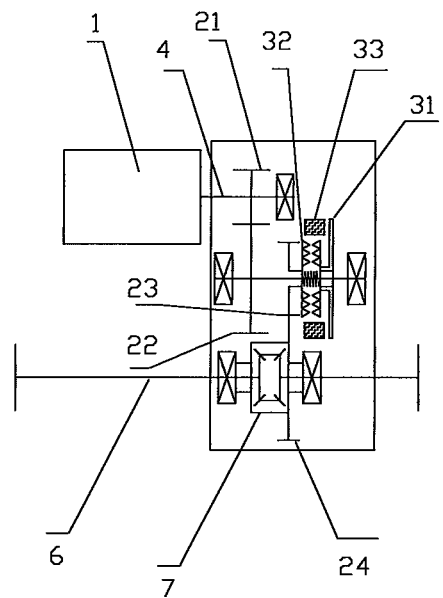
FIG. 3 is a schematic diagram of the structure of a vehicle electrically driving assembly of the third embodiment of the present invention.

As shown in FIG. 3, the third embodiment of the present invention differs from the first embodiment in that the installation location of the electromagnetic tooth-mounted clutch is different. In the third embodiment of the present invention, the electromagnetic tooth-mounted clutch is installed on the intermediate shaft 5 of the speed reducer.

The fixed face tooth 32 is installed on the second stage driving gear 23, the second stage driving gear 23 is loosely nested on the intermediate shaft 5, and the movable face tooth 31 is installed on the intermediate shaft 5 via a transmission pair and is slidable on the transmission pair. The first stage driving gear 21 is fixedly connected to the input shaft 4, the first stage driven gear 22 is fixedly connected to the intermediate shaft 5, and the second stage driven gear 24 is fixedly connected to the differential 7.

The power transmission mode of the electrically driving assembly of the embodiment of the present invention is particularly as follows:

The electric motor 1 drives the input shaft 4 to rotate, and in turn drives the first stage driving gear 21 to rotate. Because the first stage driving gear 21 engages with the first stage driven gear 22, the first stage driving gear 21 in turn drives the first stage driven gear 22 to rotate. Because the first stage driven gear 22 is fixedly connected to the intermediate shaft 5, the first stage driven gear 22 in turn drives the intermediate shaft 5 to rotate, and in turn drives the movable face tooth 31 on the intermediate shaft 5 to rotate.

When the solenoid assembly 33 is powered on, the movable face tooth 31 is driven by an armature disc to slide along the intermediate shaft 5 to a designated position and engage with the fixed face tooth 32; in turn the movable face tooth 31 drives the fixed face tooth 32 to rotate; the rotating of the fixed face tooth 32 further drives the second stage driving gear 23, to which it is fixedly connected, to rotate. Because the second stage driving gear 23 engages with the second stage driven gear 24, the second stage driving gear 23 in turn drives the second stage driven gear 24 to rotate, and finally drives the rear axle to rotate. Accordingly, the power of the electric motor 1 is transmitted to the rear axle via the speed reducer and the electromagnetic jaw clutch, to provide the driving force to the vehicle.

Other contents of the third embodiment of the present invention are the same as those of the first embodiment, and will not be described repeatedly here.

Fourth Embodiment

Figure 4:
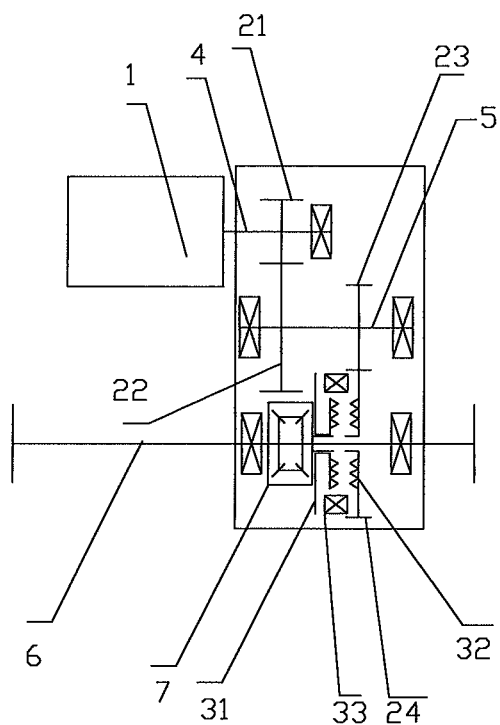
FIG. 4 is a schematic diagram of the structure of a vehicle electrically driving assembly of the fourth embodiment of the present invention.

As shown in FIG. 4, the fourth embodiment of the present invention differs from the first embodiment in that the installation location of the electromagnetic tooth-mounted clutch is different. In the fourth embodiment of the present invention, the electromagnetic tooth-mounted clutch is installed on the rear axle half shaft 6 of the speed reducer.

The fixed face tooth 32 is installed on the second stage driven gear 24, the second stage driven gear 24 is loosely nested on the rear axle half shaft 6, the differential 7 is fixedly connected to a hollow shaft, the hollow shaft is coaxial with the vehicle axle half shaft 6, and the movable face tooth 31 is installed on the hollow shaft via a transmission pair and is slidable on the transmission pair. The first stage driving gear 21 is fixedly connected to the input shaft 4, and both the first stage driven gear 22 and the second stage driving gear 23 are fixedly connected to the intermediate shaft 5.

The power transmission mode of the electrically driving assembly of the embodiment of the present invention is particularly as follows:

The electric motor 1 drives the input shaft 4 to rotate, and in turn drives the first stage driving gear 21 to rotate. Because the first stage driving gear 21 engages with the first stage driven gear 22, the first stage driving gear 21 in turn drives the first stage driven gear 22 to rotate. Because the first stage driven gear 22 is fixedly connected to the intermediate shaft 5, the first stage driven gear 22 in turn drives the intermediate shaft 5 to rotate, and in turn drives the second stage driving gear 23 on the intermediate shaft 5 to rotate. Because the second stage driving gear 23 engages with the second stage driven gear 24, the second stage driving gear 23 in turn drives the second stage driven gear 24 to rotate, and the rotating of the second stage driven gear 24 drives the fixed face tooth 32, to which it is fixedly connected, to rotate.

When the solenoid assembly 33 is powered on, the movable face tooth 31 is driven by an armature disc to slide along the rear axle half shaft 6 to a designated position and engage with the fixed face tooth 32, and in turn the fixed face tooth 32 rotates to drive the movable face tooth 31 to rotate, and finally drive the differential 7 to rotate. Accordingly, the power of the electric motor 1 is transmitted to the rear axle via the speed reducer and the electromagnetic jaw clutch, to provide the driving force to the vehicle.

Other contents of the fourth embodiment of the present invention are the same as those of the first embodiment, and will not be described repeatedly here.

Fifth Embodiment

The vehicle electrically driving assembly of the fifth embodiment of the present invention is installed on the front axle half shaft of rear driven purely electrically driven or hybrid vehicles.

When the power of the entire vehicle is insufficient at the startup acceleration phase or the acceleration phase during running, the electrically driving assembly can, by using the electromagnetic clutch, provide an auxiliary driving force, which overcomes the defect of the insufficient acceleration performance of new energy vehicles. When the entire vehicle completes the acceleration and maintains a low acceleration or does not accelerate, the power of the electrically driving assembly can be instantly released from the entire vehicle by separating the electromagnetic clutch, to restore the rear drive mode.

Other contents of the fifth embodiment of the present invention are the same as those of the first embodiment to the fourth embodiment, and will not be described repeatedly here.

Sixth Embodiment

In the sixth embodiment of the present invention, the vehicle electrically driving assembly serves as the master drive of purely electrically driven or hybrid vehicles. The electromagnetic tooth-mounted clutch enables the power of the electric motor to be released and engaged with the entire vehicle instantly at any moment, and thus the problem that the startup and stop of the existing purely electrically driven or hybrid vehicles can only rely on the startup and stop of the electric motor, and the problem that the startup and stop response time is delayed are solved.

Other contents of the sixth embodiment of the present invention are the same as those of the first embodiment to the fourth embodiment, and will not be described repeatedly here.

The above descriptions are merely preferable embodiments of the present invention, and are not used to limit the protection scope of the present invention. Any modifications, equivalent substitutions or improvements made within the spirit and principle of the present invention are all included in the protection scope of the present invention.

What is claimed is:

1. A vehicle electrically driving assembly, connected to vehicle axle half shafts of a vehicle, wherein
the vehicle electrically driving assembly comprises: an electric motor, a speed reducer, an electromagnetic tooth-mounted clutch and a differential;
the speed reducer is provided with multiple stages of gears, an input shaft and an intermediate shaft;
the differential is connected between the vehicle axle half shafts;
the electromagnetic tooth-mounted clutch is installed on the intermediate shaft of the speed reducer; and
when the electromagnetic tooth-mounted clutch is in engagement, a driving force of the electric motor is transmitted to the vehicle axle half shafts via the speed reducer and the electromagnetic law clutch, to provide the driving force to the vehicle;
the speed reducer comprises: a first stage driving gear, a first stage driven gear, a second stage driving gear and a second stage driven gear, and the gears of the same stage are in engagement; and
the electromagnetic tooth-mounted clutch comprises: a fixed face tooth, a movable face tooth, a solenoid assembly and a return elastic assembly, and when the solenoid assembly is powered off, the return elastic assembly drives the movable face tooth to reset, the return elastic assembly is a spring, an elastic sheet, a diaphragm spring or a spring assembly, and the spring assembly comprises several springs.

2. The vehicle electrically driving assembly according to claim 1, wherein
the fixed face tooth is installed on the second stage driving gear, the second stage driving gear is loosely nested on the intermediate shaft, and the movable face tooth is installed on the intermediate shaft via a transmission pair and is slidable on the transmission pair; and
the first stage driving gear is fixedly connected to the input shaft, the first stage driven gear is fixedly connected to the intermediate shaft, and the second stage driven gear is fixedly connected to the differential.

3. The vehicle electrically driving assembly according to claim 1, wherein
the solenoid assembly comprises: a coil housing, wires and a sealant; and
the electromagnetic tooth-mounted clutch is a normally open clutch or a normally closed clutch.

4. The vehicle electrically driving assembly according to claim 1, wherein
a rear end cover of the electric motor and a front housing of the speed reducer are the same housing.

5. The vehicle electrically driving assembly according to claim 1, wherein
the vehicle electrically driving assembly is master drive or assist drive, and
the vehicle axle half shafts including front axle half shafts or a rear axle half shafts.

6. The vehicle electrically driving assembly according to claim 2, wherein
the transmission pair is a spline, a single key, a square shaft or a flat shaft.

* * * * *